(12) United States Patent
Sar et al.

(10) Patent No.: US 8,757,601 B2
(45) Date of Patent: Jun. 24, 2014

(54) DAMPED SPLIT BEAM STRUCTURAL MEMBER WITH SEGMENTED BEAM PARTS

(75) Inventors: David R. Sar, Corona, CA (US); Terry M. Sanderson, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 257 days.

(21) Appl. No.: 13/227,744

(22) Filed: Sep. 8, 2011

(65) Prior Publication Data

US 2012/0061888 A1 Mar. 15, 2012

Related U.S. Application Data

(60) Provisional application No. 61/381,249, filed on Sep. 9, 2010, provisional application No. 61/381,254, filed on Sep. 9, 2010.

(51) Int. Cl.
*F16F 7/08* (2006.01)
*E04C 2/34* (2006.01)

(52) U.S. Cl.
USPC ............................ 267/136; 188/381; 52/843

(58) Field of Classification Search
USPC ............ 188/381; 267/136; 52/836, 839, 834, 52/843; 416/229 R, 140, 226; 244/123.8, 244/124
See application file for complete search history.

(56) References Cited

U.S. PATENT DOCUMENTS

| | | | | |
|---|---|---|---|---|
| 3,519,228 A | * | 7/1970 | Windecker | 244/123.5 |
| 4,462,755 A | * | 7/1984 | Ogle et al. | 416/132 R |
| 4,843,777 A | * | 7/1989 | Shimabukuro | 52/839 |
| 4,981,215 A | * | 1/1991 | Ilic | 206/521 |
| 5,269,657 A | | 12/1993 | Garfinkle | |
| 5,712,011 A | | 1/1998 | McMahon et al. | |
| 8,500,409 B2 | * | 8/2013 | Baker et al. | 416/226 |
| 2011/0243750 A1 | * | 10/2011 | Gruhn et al. | 416/226 |

FOREIGN PATENT DOCUMENTS

| | | |
|---|---|---|
| DE | 10138250 A1 | 9/2002 |
| DE | 102006043876 A1 | 4/2008 |
| EP | 0886078 A2 | 12/1998 |
| GB | 2235733 A | 3/1991 |
| JP | 58174739 A * | 10/1983 |
| JP | 06081873 A * | 3/1994 |

OTHER PUBLICATIONS

International Search Report and Written Opinion from corresponding International Application No. PCT/US11/50785.

* cited by examiner

*Primary Examiner* — Anna Momper
(74) *Attorney, Agent, or Firm* — Renner, Otto, Boisselle & Sklar, LLP

(57) ABSTRACT

A structural member includes a split beam within a box structure. The split beam may be a segmented beam that includes multiple segments for each of its parts. Movement of the split beam parts within the box structure, as the structural member flexes, dissipates energy and adds to the damping of the structural member.

20 Claims, 3 Drawing Sheets

DAMPED SPLIT BEAM STRUCTURAL MEMBER WITH SEGMENTED BEAM PARTS

This application claims priority under 35 USC 119 to U.S. Provisional Application No. 61/381,249, filed Sep. 9, 2010, and to U.S. Provisional Application No. 61/381,254, filed Sep. 9, 2010. Both of the above applications are incorporated herein by reference in their entireties.

BACKGROUND OF THE INVENTION

1. Field of the Invention

The invention is in the field of stiff structural members, such as aircraft spars and other structural members that undergo cantilever forces or cantilever-like forces.

2. Description of the Related Art

Mechanically stiff structural members, such as wing spars, typically have very low damping constants. Traditionally, stiff structural members such as those used in aircraft spars have been subject to resonances that limit the performance capabilities of the structure. This results in structures having distinct resonances which can be excited, such as (for wing spars) by flight conditions. These resonances can be in the form of the fundamental cantilever resonance frequency, or can be in the form of higher modes such as those encountered during "flutter" of aerodynamic control surfaces, in which the resonant characteristics of the wing couple to the airflow past the wing. Resonances can cause reduced range/performance, difficulty in attitude control, and flutter and/or structural failure, to name just a few potential problems. FIG. 1 illustrates resonance in a typical spar 10.

SUMMARY OF THE INVENTION

According to an aspect of the invention, stiff structural members possess vibration damping constants on the order of critical.

According to another aspect of the invention, a segmented split beam structures allows for independent setting of the friction and damping as a function of the location along the beam.

According to yet another aspect of the invention, changing the way in which the split beam is anchored within the retaining box structure allows for additional optimization of damping as a function of location along the spar.

According to still another aspect of the invention, a structural member includes: an external box structure; and a split segmented beam within the box structure. The structural member may include one or more of the following features: the split segmented beam includes a pair of longitudinally-split beam parts; each of the beam parts include multiple segments; the segments of each of the beam parts are separated from one another by gaps; the splits between the segments are in a direction substantially perpendicular to the longitudinal split between the beam parts; each of the beam parts includes the same number of segments; one of the beam parts includes a different number of segments than the other of the beam parts; the segments of one of the beam parts overlap gaps between segments of the other of the beam parts; portions of the beam parts extend into a structure root to which the external box is attached; the beam parts are able to "float" within the box structure; the box structure puts a pressure force on the beam parts; a lubricant layer is located between the beam parts, with the beam parts able to slide relative to each other as the structural member flexes; the external box structure is a square or other rectangular channel; and/or the beam parts are shorter than the length of the box, allowing segments of the beam parts to move longitudinally within the box.

According to a further aspect of the invention, a structural member includes: an external box structure; and a split beam within the box structure.

According to a still further aspect of the invention, a method of dissipating energy in a structural member includes: providing a structural member that includes an external box structure and a split beam within the box structure; and dissipating energy by relative motion of beam parts of the beam as the structural member is flexed.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

DETAILED DESCRIPTION

A structural member includes a split beam within a box structure. The split beam may be a segmented beam that includes multiple segments for each of its parts. Movement of the split beam parts within the box structure, as the structural member flexes, dissipates energy and adds to the damping of the structural member.

Figure 1:
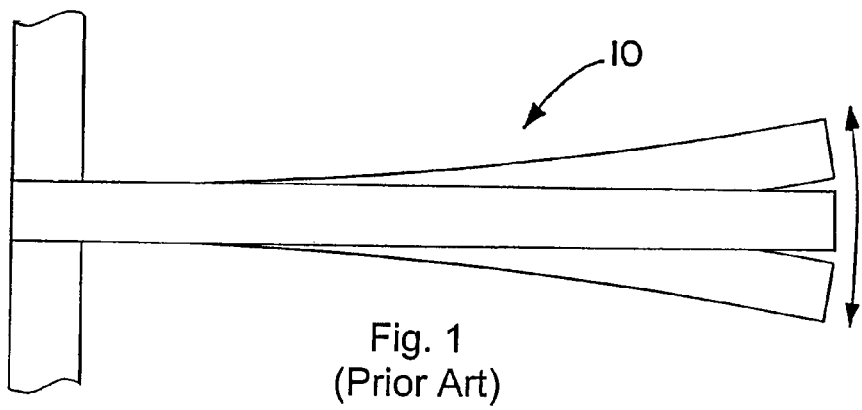
FIG. 1 is a side view illustrating forces on a cantilever beam.
Figure 2:
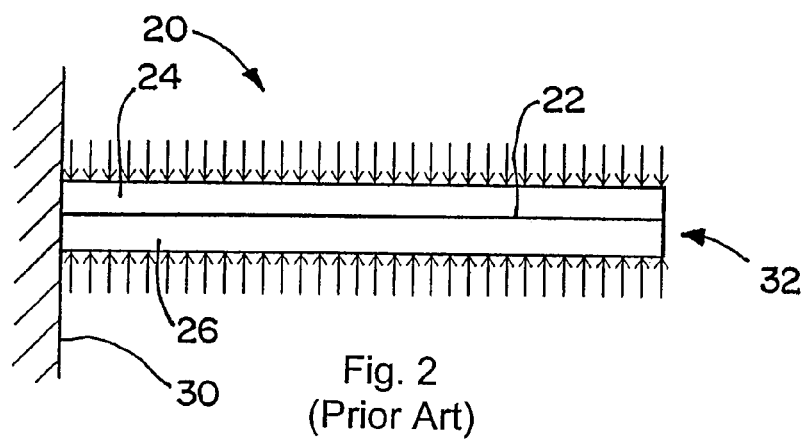
FIG. 2 is a side view illustrating a prior art split beam arrangement.
Figure 3:
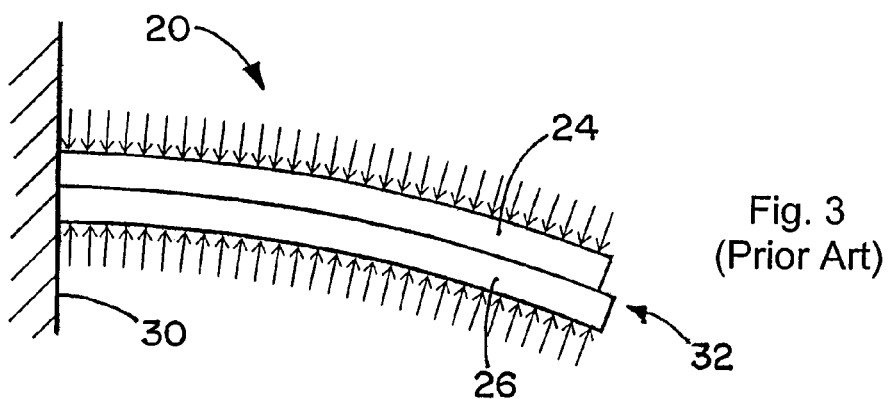
FIG. 3 is a side view showing the beam of FIG. 2 under load.
Figure 4:
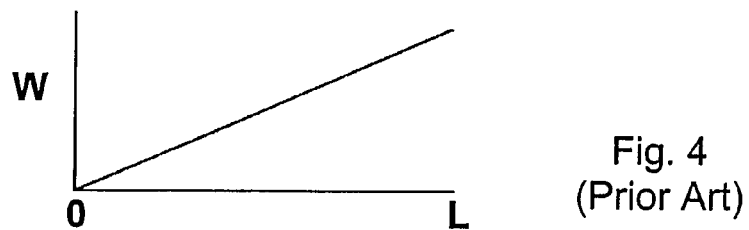
FIG. 4 is a graph qualitatively illustrating the energy dissipation in the beam of FIG. 2.

Referring now to FIGS. 2 and 3, in the publication "Analysis of Slip Damping With Reference to Turbine Blade Vibration" L. E. Goodman and J. H. Klumpp, Journal of Applied Mechanics, September 1956, the authors looked at a situation in which a beam 20 is sliced longitudinally along its length, with the plane 22 of the slice being perpendicular to any potential cantilever forces. The damping comes from the two halves 24 and 26 of the sliced beam 20 being clamped back together along their length so that, when cantilever force is applied, they could slip along the slice plane 22 with friction, which damps the energy imparted by the cantilever force. Goodman and Klumpp assumed even clamping force along entire beam 20. As is typical of friction dampers, there is an optimum clamping force that will maximize the damping. However the problem of "dry locking" was not addressed, in which the friction is high enough to prevent the beam from returning to its original position (hysteresis). For a wing spar, this hysteresis would mean that the spar would not return to its original position after removal of a load, but would remain "hung" in a deformed state. Additionally, the problem was not addressed as to how to anchor the beam halves 24 and 26 to provide an appropriate distribution of damping along the beam's length. Goodman and Klumpp's version, as applied to a wing spar, would have the beam halves firmly attached together at the wing root (corresponding to the fixed root 30 of the cantilever beam 20) and free to slip under friction going out to the wing tip (corresponding to the free end 32 of the cantilever beam 20). The energy dissipation for this would be zero at the wing root, and at a maximum at the wing tip. This distribution is illustrated in FIG. 4, which qualitatively shows energy distribution (W) versus beam length (L). This distribution is the opposite of what is desirable, since the strain energy distribution along the beam 20 is at a maximum at the root and decays to zero at the beam tip. The distribution of damping would benefit from being more even.

The present invention solves several of the problems from the prior art. In particular, this invention changes the way that the split beam is configured and utilized. The split beam structure would be mounted inside a box beam, which would provide structural integrity, and provide the clamping force for the split beam structure. The split beam structure would be sliced, at right angles to the slip plane, into a number of segments, and space (gaps) would be provided between the segments to provide for slip motion. It is possible that the slices in the top half could be staggered with respect to the slices in the lower half to minimize the introduction of planes of weakness along the spar. The internal split beam structures could be loosely constrained by dowel pins in oversized slots or some other means to provide freedom of motion while retaining the components in their approximate positions within the box beam. Clamping forces along each segment can now be adjusted independently to achieve the correct level of friction and damping for a particular location along the structure.

Figure 5:
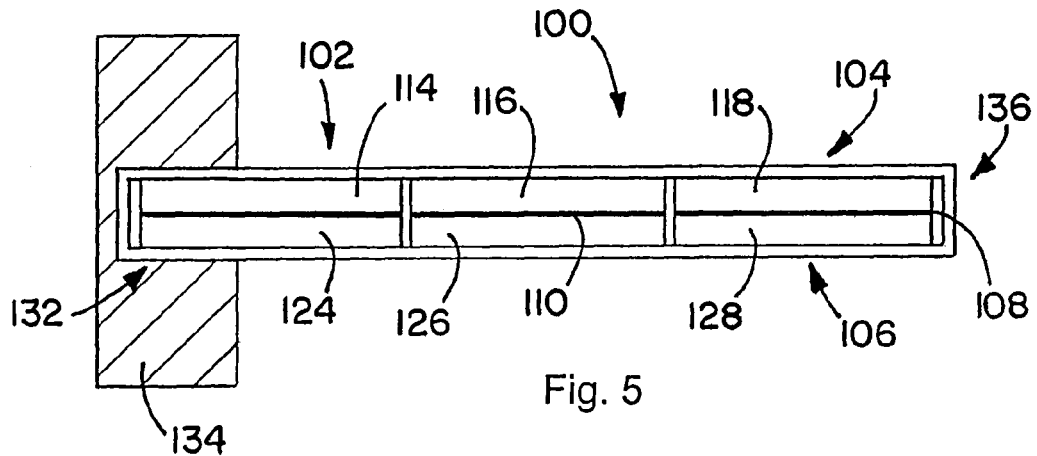
FIG. 5 is a side view showing a structural member according to an embodiment of the present invention.
Figure 6:
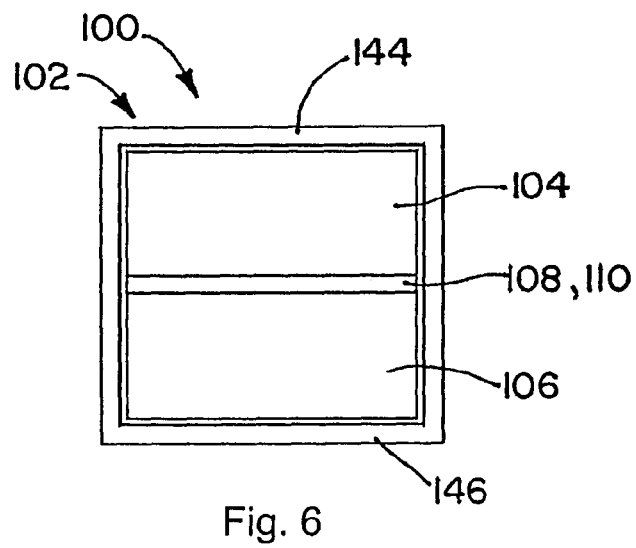
FIG. 6 is cross-sectional end view of the structural member of FIG. 5.

Referring now to FIGS. 5 and 6, a structural member 100 has an external box structure 102, with split beams halves or parts 104 and 106 inside the box structure 102. The external box structure 102 provides clamping pressure, pressing the beam parts 104 and 106 together, as well as providing structural integrity. The box structure 102 may be a square or other rectangular channel of material that surrounds and encloses the beam parts 104 and 106.

The split beam parts 104 and 106 are split longitudinally, with the top beam part 104 separated from the bottom beam part 106 along a central horizontal plane 108. A lubricant layer 110 may be located at the plane 108 separating the beam parts 104 and 106. Alternatively or in addition, the beam parts 104 and 106 may have their surfaces treated, to affect the amount of sliding friction between the beam parts 104 and 106. For example, the one or both of the contacting surfaces could be sandblasted. A small amount of lubricant may be used to minimize galling, depending upon the amount of friction required for a given situation.

In addition the beam parts 104 and 106 are split into segments, with the upper beam part 104 in segments 114, 116, and 118, and the lower beam part 106 in segments 124, 126, and 128. There are gaps between adjacent of the segments. It will be appreciated that the beam parts 104 and 106 may alternatively be split into a greater or lesser number of segments from what is shown in the illustrated embodiment. Dowel pins or other devices (not shown) may be used to constrain or limit the travel of the individual segments.

The ends of the beam parts 104 and 106 float unanchored. At the proximal end 132 of the structural member 100, where the structural member 100 is attached to fixed structure (root) 134 within a recess 135 in the structure root 134, and where the segments 114 and 124 are located, the beam parts 104 and 106 (the proximal ends of the beam segments 114 and 124) float unanchored. At the distal end 136 of the structural member 100, where the segments 118 and 128 are located, the beam parts 104 and 106 (the distal ends of the beam segments 118 and 128) float unanchored.

The beam parts 104 and 106 are somewhat shorter than the length of the box 102. This allows the segments of the beam parts 104 and 106 to move longitudinally within the box 102. The proximal segments 114 and 124 may extend into the portion of the box 102 that is within the root structure 134, but the beam parts 104 and 106 are not fixedly attached to either the box 102 or the root structure 134.

Figure 7:
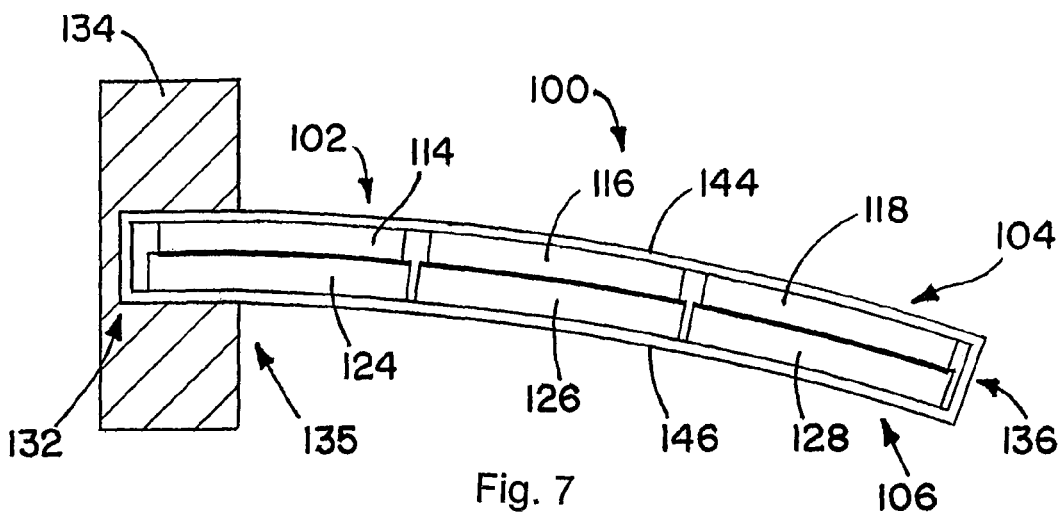
FIG. 7 is a side view showing the structural member of FIG. 5 under load.
Figure 8:
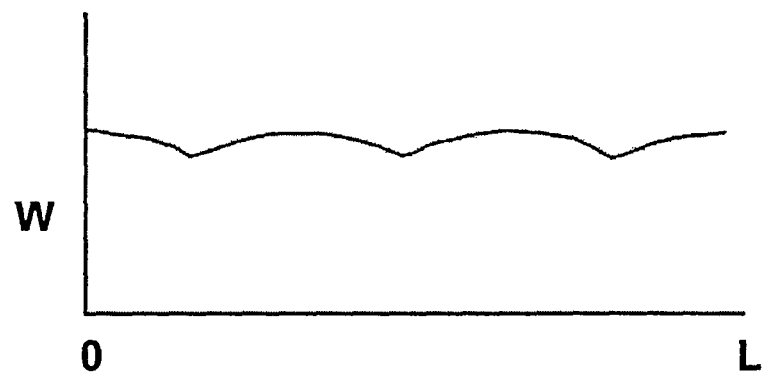
FIG. 8 is a graph qualitatively illustrating the energy dissipation in the structural member of FIG. 5.

Having the ends of the beam parts 104 and 106 unanchored, and having the segments 114-118 and 124-128 free to move within the box structure 102, advantageously spreads the energy dissipation more evenly. FIG. 7 shows the structural member 100 in a loaded condition, with the structural member 100 curved from a load. A top box surface 144 and a bottom box surface 146 press against the beam parts 104 and 106, providing friction between the beam parts 104 and 106 (between the segments that are in contact with one another). FIG. 8 is graph qualitatively illustrating the energy dissipated (W) versus beam length (L) for the structural member 100. It will be appreciated that the energy dissipation shown in FIG. 8 is much more evenly distributed over the beam length than is the energy dissipation of the prior art beam, shown qualitatively in the graph of FIG. 4. The even energy dissipation provides better damping, and advantageously dissipates more energy close to the root of the structural member 100 (at the proximal end 132 of the structural member 100).

Energy is dissipated by the frictional damping between the beam segments as the segments slide against each other. The beam shear stress drives motion along the slip plane 108, which is a maximum at the neutral axis.

It will be appreciated that the damping level is changed by varying the clamping pressure on the beam parts 104 and 106. The clamping pressure may be controlled by putting appropriate devices/mechanisms between the box surfaces 144 and 146 and the beam parts 104 and 106. Mechanisms such as scissor jack mechanisms, or elliptical cams (such as toothed elliptical gear cams that engage toothed or grooved surfaces on the box top and bottom 144 and 146, and the beam parts 104 and 106) may be used to vary and control the pressure between the box 102 and the beam parts 104 and 106. Controlling the pressure on the beam parts 104 and 106 controls the normal force between the beam parts 104 and 106, which controls the sliding friction between the beam parts 104 and 106, which affects the amount of damping.

The structural member 100 provides good stiffness, while also providing at least a critically damped response to vibrations, such as vibrations over the 0.1 to 10 Hz frequency band. The structural member 100 can accomplish this damping while only using conventional, as opposed to exotic, materials. In addition the damping is provided in a passive manner, in that it is built into the structural material system itself. It does not utilize any external controllers, actuators, or power sources.

The structural member 100 could be configured to provide critical damping (damping ratio of 1), or could be configured to provide a lower damping ratio, such as about 0.25. It will be appreciated that lower damping ratios would reduce shocks. For example, a wing spar having a damping ratio of about 0.25 would reduce flight shocks, especially during launch. Reducing flight shocks is desirable, since shocks and vibration adversely affect IMU (inertial measurement unit) signals, which in turn adversely affects autopilots and guidance systems. Being able to avoid or substantially reduce flight shock and vibration results in higher performing guidance systems.

The various components of the structural member 100 may be made using a variety of suitable materials. Suitable materials include steel, aluminum, titanium, and other metals and alloys. The lubricant layer 110 may include any of a variety of suitable industrial lubricants, such as a grease or oil film. Goodman and Klumpp utilized a mixture of $MoS_2$ and vegetable oil as a lubricant.

Figure 9:
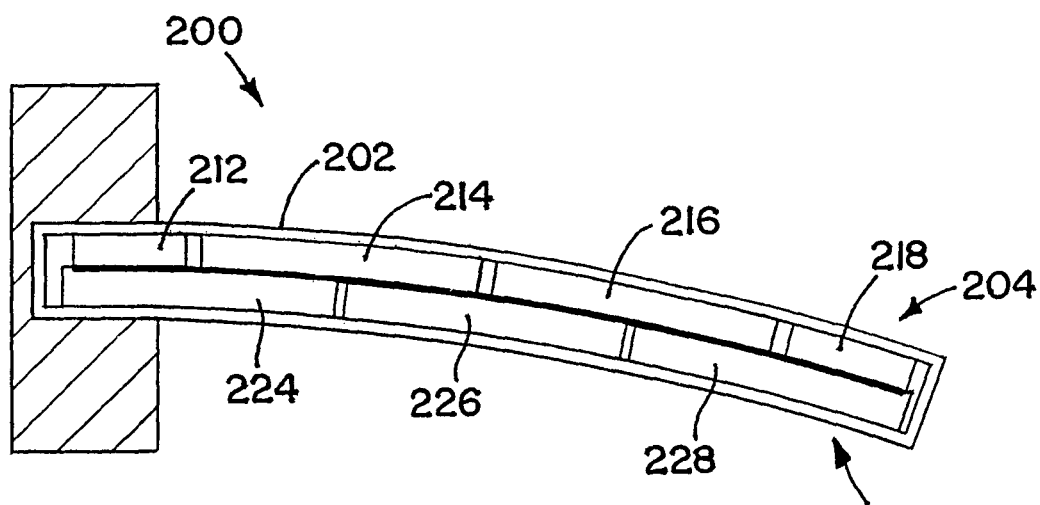
FIG. 9 is a side view showing a structural member according to another embodiment of the present invention.

FIG. 9 shows an alternate structural member 200 that has staggered segments. The structural member 200 has a box 202 that encloses beam parts 204 and 206. The top beam part 204 is split into four segments 212, 214, 216, and 218. The bottom beam part 206 is splint into three segments 224, 226, and 228. The beam segments are staggered, with the top part segments overlapping the gaps between the bottom half segments, and vice versa. The overlapping between the staggered segments may aid in reducing planes of weakness. In other respects the structural member 200 may be similar to the structural member 100, providing similar advantages to those described above with regard to the structural member 100.

The beams described above may be wing spars, running along a substantial portion of the span of a wing of a manned or unmanned aircraft. It will be appreciated that the beams described herein may also be used in other sorts of structures. An example of another suitable use for the structural members described herein is in structures used in truck weighing stations, where the need for a damped structure is important.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A structural member comprising:
an external box structure; and
a split beam within the box structure including longitudinally-split beam parts;
wherein a beam part is split in a direction substantially perpendicular to the longitudinal split between the beam parts, thereby forming segments; and
wherein the segments of the beam part are separated from one another by gaps, allowing parts of the split beam to shift position relative to each other as the structural member flexes.

2. The structural member of claim 1, wherein each of the beam parts includes multiple segments.

3. The structural member of claim 2, wherein the segments of each of the beam parts are separated from one another by gaps.

4. The structural member of claim 3, the segments of one of the beam parts overlap gaps between segments of the other of the beam parts.

5. The structural member of claim 2, wherein each of the beam parts includes the same number of segments.

6. The structural member of claim 2, wherein one of the beam parts includes a different number of segments than the other of the beam parts.

7. The structural member of claim 1, wherein the beam parts are shorter than a length of the box, allowing segments of the beam parts to move longitudinally within the box.

8. The structural member of claim 1, in combination with a structure root to which the external box is attached.

9. The combination of claim 8,
wherein the box is attached at a recess in the structure root; and
wherein portions of the split beam extend into the recess in the structure root.

10. The structural member of claim 1, further comprising a lubricant layer is located between the beam parts, with the beam parts able to slide relative to each other as the structural member flexes.

11. The structural member of claim 1, wherein portions of the split beam shift position relative to the box structure as the beam flexes.

12. The structural member of claim 11, wherein the box structure puts a pressure force on the beam parts.

13. The structural member of claim 1, wherein the external box structure is a rectangular channel.

14. The structural member of claim 1, wherein a top box portion and a bottom box portion press against the beam parts.

15. The structural member of claim 1, wherein the parts of the split beam shift position longitudinally relative to each other.

16. The structural member of claim 1, wherein the split in a direction substantially perpendicular to the longitudinal split between the beam parts forming the segments bisects a longitudinal axis of the beam parts.

17. A method of dissipating energy in a structural member, the method comprising:
providing a structural member that includes an external box structure and a split beam within the box structure, wherein the split beam includes a pair of longitudinally-split beam parts, wherein a beam part is split in a direction substantially perpendicular to the longitudinal split between the beam parts, thereby forming segments, and wherein the segments of the beam part are separated from one another by gaps, allowing parts of the split beam to shift position relative to each other as the structural member flexes; and
dissipating energy by relative motion of the beam parts of the beam as the structural member is flexed.

18. The method of claim 17, further comprising providing the structural member partially within a recess in a structure root to which the external box structure is attached, with the split beam extending into the recess.

19. The method of claim 17, wherein the dissipating further includes longitudinally moving the beam parts relative to each other.

20. The method of claim 17, wherein the dissipating further includes longitudinally moving the beam parts relative to the box structure.

\* \* \* \* \*